United States Patent [19]

Kuwahara

[11] Patent Number: 4,977,823
[45] Date of Patent: Dec. 18, 1990

[54] CIRCULATIVE CATERING TABLE PROVIDED WITH COOL AIR CIRCULATING SYSTEM

[75] Inventor: Kiyohiro Kuwahara, Kanazawa, Japan

[73] Assignee: Nihon Kuresento Kabushiki Kaisha, Matto, Japan

[21] Appl. No.: 387,968

[22] Filed: Aug. 1, 1989

[30] Foreign Application Priority Data

Aug. 2, 1988 [JP] Japan ................. 63-102528

[51] Int. Cl.$^5$ ............... A47J 37/00; A47J 37/06
[52] U.S. Cl. ................................... 99/355; 62/256;
62/378; 99/357; 99/443 C; 99/470; 99/479;
126/299 R; 186/42; 186/49
[58] Field of Search ............... 99/355, 357, 361, 362,
99/386, 443 C, 470, 474, 476, 477, 478, 479,
483, 484, 517; 126/299 R; 62/256, 250, 246,
381, 380, 378; 198/367, 599; 186/42, 49, 38, 50,
44

[56] References Cited

U.S. PATENT DOCUMENTS

| | | | |
|---|---|---|---|
| 2,950,605 | 8/1960 | Hennion | 62/250 |
| 3,528,362 | 9/1970 | Arnold, Jr. | 99/357 |
| 3,718,082 | 2/1973 | Lipoma | 99/355 |
| 3,961,569 | 6/1976 | Kenyon et al. | 99/443 C |
| 4,165,620 | 8/1979 | Kiesel et al. | 62/256 |
| 4,329,852 | 5/1982 | Ibrahim et al. | 62/256 |
| 4,349,086 | 9/1982 | Yamada | 186/49 |
| 4,523,520 | 6/1985 | Hofmann et al. | 99/355 |
| 4,582,046 | 4/1986 | Yamada | 126/299 R |
| 4,750,335 | 6/1988 | Wallace et al. | 62/256 |
| 4,796,601 | 1/1989 | Yamada | 126/299 R |

FOREIGN PATENT DOCUMENTS 58-18085 4/1983 Japan.

Primary Examiner—Timothy F. Simone
Attorney, Agent, or Firm—Wenderoth, Lind & Ponack

[57] ABSTRACT

A circulative catering table provided with an endless conveyer circulating according to the circulating course supported in a horizontal plane at the designated height by a base frame and supporting the foods at the designated intervals, an appropriate number of counters for eating and drinking disposed outside of the endless conveyer and a cooling system for the foods on the endless conveyer. The circulative catering table has a first cool air path forming a lower opening by providing a gap between the outside of the endless conveyer and the counter and extending downwards of the base frame in communication with the lower opening and a second cool air path disposed in opposition to the lower opening against the endless conveyor, with the lower part thereof in communication with the first cool air path and with the upper opening at the upper end that uniformly blows out the cool air in a direction crossing the endless conveyer and toward the space above the lower opening. The first and the second paths are covered with heat insulators. The second cool air path is provided with a blowing means which sends the air of the first cool air path thereinto and blows out of the upper opening and a cooling means for cooling the air sent in from the first cool air path. Moreover, a guide portion extending over the lower opening and forming a gap for taking out the foods placed on the endless conveyer.

3 Claims, 2 Drawing Sheets

CIRCULATIVE CATERING TABLE PROVIDED WITH COOL AIR CIRCULATING SYSTEM

BACKGROUND OF THE INVENTION

The present invention relates to a circulative catering table for serving customers with foods and the like by an endless conveyer circulating along the designated path, more particularly to a circulative catering table provided with a cool air circulating system for supplying cool air over foods to maintain the freshness during the conveyance of foods.

In serving customers sitting at the counters with foods such as meat, fish, sushi and the like placed on a circulating endless conveyers, the freshness is lost because of foods becoming warmer in circulation when the room temperature becomes high in summer time or when fire is used in the room.

Accordingly, the foods on the endless conveyer must be cooled. This kind of a circulative catering table which is provided with a cooling system has been disclosed in the Japanese Patent Publication No. 58-18085.

The counter for drinking and eating disclosed in the above is such arranged that the outer circumference of an endless conveyer for conveying foods is enclosed by a circulating path with an annular cross-section and cool air is blown directly on meals from a refrigerant pipe disposed along the conveyer. In this case, the problem was that foods were likely to dry. Another problem is that the temperature of cool air easily rises and its circulation is not effective since heat insulator is not used in the cool air circulating path for preventing its temperature from rising up.

SUMMARY OF THE INVENTION

In a circulative catering table including an endless conveyer for circulating foods supporting at designated intervals and according to a circulating path supported in a plane at designated height by a base frame and a suitable number of counters for eating and drinking which are disposed outside of the conveyer, a first cool air path having a designated space outside of the conveyer and between the conveyer and the counter to form a lower opening, communicating with said opening and extending downwards of the base frame and a second cool air path which is disposed opposing to the first cool air path against the conveyer and the lower portion of which is communicated with the first cool air path and having an upper opening to uniformly blow out cool air upward of the lower opening and in a direction crossing above the conveyer. Moreover, a cool air supply means is provided to send the cool air of the first cool air path to the second cool air path for blowing out of the upper opening of the second cool air path while a cooling means is provided in the second cool air path to further cool the cool air inside. At the upper opening of the second cool air path, a cool wind guide is provided, one end of which is fixed and the other end of which extends from above the lower opening toward the lower opening so as to enclose the upper portion of the endless conveyer. Between the lower end of the cool wind guide and the lower opening, a gap is provided enough to take out foods placed on the endless conveyer. The cool wind guide is made of a transparent member so as to easily identify foods on the endless conveyer.

The cool air cooled by the cooling means and blown out of the upper opening goes down being guided by the cool wind guide and acts as an air curtain closing the gap between the lower end of the cool wind guide and the lower opening to prevent the cool air from escaping out of this portion. The ambient air cooled by the cool air blown out of the upper opening goes down to foods and forms a cool atmosphere above the foods to cool the foods.

The first and the second cooling paths are covered by heat insulators to prevent the increase of temperature of the cool air at these points. It is also possible to grill meat indoors without smoke by providing with smokeless roasters at suitable places on counters for eating and drinking.

An object of the present invention is to provide a circulative catering table provided with cool air circulating system which is capable to prevent foods from becoming dry and untasty due to exposition to cool air in cooling by cool air the foods conveyed on the endless conveyer.

Another object of the present invention is to provide a circulative catering table provided with cool air circulating system which is capable to improve cooling efficiency in cool air circulating path by further decreasing the rise of temperature in the cool air circulating path.

A further object of the present invention is to provide a circulative catering table provided with cool air circulating system which is capable to use in the fields of not only a "sushi" circulating bar but also a meat roasting restaurant and the like by equipping with smokeless roasters on counters for eating and drinking.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
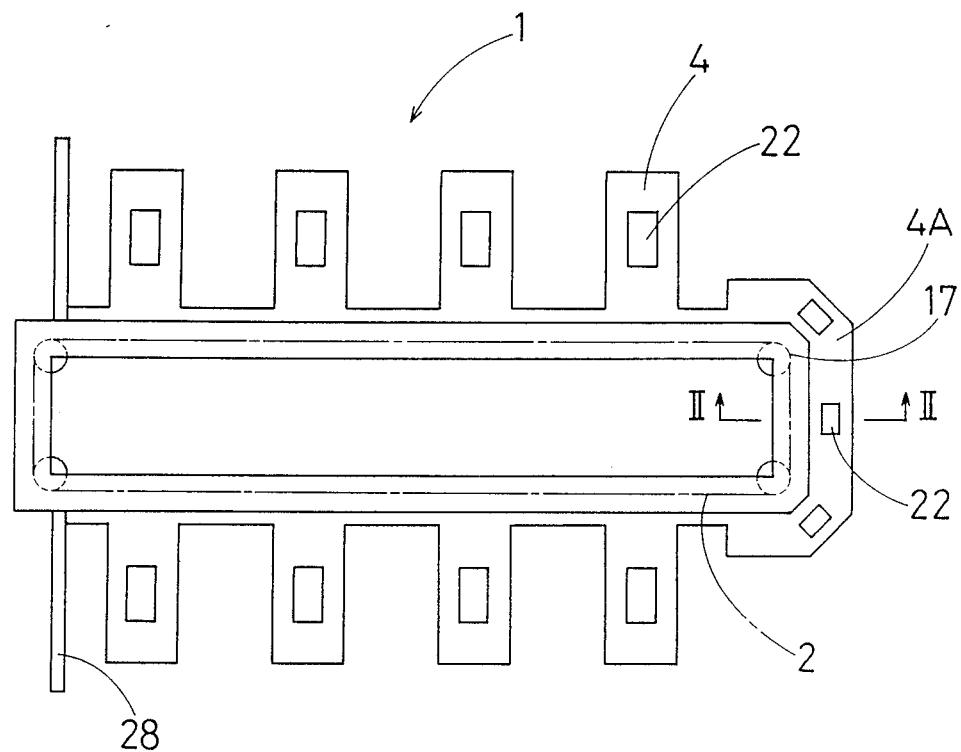
FIG. 1 is a plan view showing a circulative catering table provided with cool air circulating system of this invention.
Figure 2:
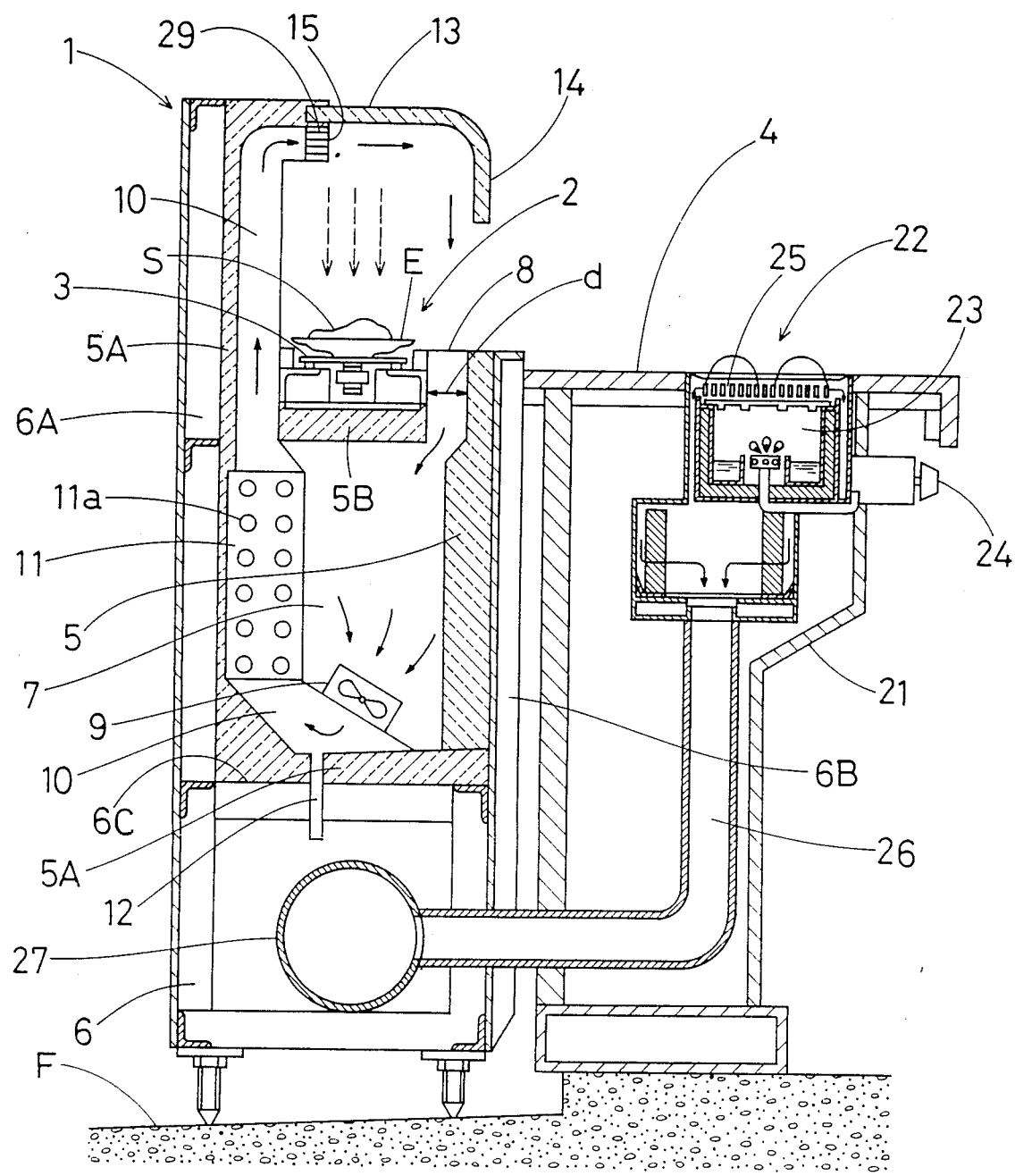
FIG. 2 is an enlarged view of the cross-section taken along the line II—II of FIG. 1.

Referring to FIG. 1 and 2, a circulative catering table 1 is provided with an endless crescent conveyer 2 disposed along a rectangular-shaped fringe portion in a horizontal plane. The crescent conveyer 2 is supported at the designated height from the floor surface F by an inside wall 6A and an outside wall 6B provided projecting upward from the inside and the outside of a base frame 6 which is rectangular at the cross section and has a hollow portion 6a inside. The crescent conveyer 2 is provided with a crescent chain 3 disposed with crescent-shaped crescent plates 3a continuously and rotatably in a horizontal plane. At the opposite outside of the crescent conveyer 2 is the longitudinal direction, counters for eating and drinking 4 are provided at designated intervals and extending outside while another form of counters 4A are provided at one shorter side and at its both corners such as to enclose this portion.

The other end portion opposite to the counters 4A of the crescent conveyer 2 is partitioned by a partition 28 where foods are prepared inside of the partition 28 to place on the crescent plates 3a of the crescent chain 3.

The upper end of the outside wall 6B of the base frame 6 is positioned a little higher than the crescent plates 3a of the crescent chain 3. The outside wall 6B is attached with a heat insulator 5 along its inside surface and between the inside surface of the insulator 5 and the outside portion of the crescent conveyer 2, a gap with a designated dimension d is formed, the upper part of which is a cool air intake port 8.

The upper end of the inside wall 6A of the base frame 6 is positioned higher by a designated dimension than the crescent plates 3a of the crescent chain 3, and being spaced by a designated distance from the inside wall 6A, a second cool air path 10 is provided An air cooling portion 11 is provided for cooling air in the second cool air path 10. In the air cooling portion 11, a plurality of cooling pipes 11a are disposed and the air passing is cooled by the refrigerant flowing therethrough. The lower portion of the second cool air path 10 provided lower than the air cooling portion 11 is supported by an upper member 6C of the base frame 6 through a heat insulator 5A.

The lower portion of the crescent conveyer 2 is also attached with a heat insulator 5B. One end of the heat insulator 5B contacts with the side wall of the second cool air path 10 above the air cooling portion 11 while the gap between the other end and the inside surface of the heat insulator 5 has the same size d with the cool air intake port 8. The port enclosed by the second cool air path 10 including the heat insulators 5, 5A, the air cooling portion 11 and the heat insulator 5B from a first cool air path 7, into which air is flowed from the cool air intake 8.

A suitable number of fans 9 are provided at the lower part of the first cool air path 7 to send the air in the first cool air path 7 into the second cool air path 10.

The upper end portion of the second cool air path 10 is positioned above the crescent conveyer 2 where a cool air exit 15 is provided. The cool air exit 15 is provided with a rectifying plate 29 to prevent the wind from being turbulent, prevent the open air from coming in the air intake port 8, also prevent the cool air from directly contacting the foods S. The air blown out of the cool air exit 15 uniformly flows parallel to the crescent plates 3a and toward above the cool air intake port 8.

The gap formed between the inside wall 6A of the base frame 6 and the second cool air path 10 is provided with a heat insulator 5C integral with the heat insulator 5A at the lower end portion. At the upper end side of the heat insulator 5C and above the cool air exit 15, a cool wind guide 13 is fixed at one end thereof. The cool wind guide 13 extends parallel to the crescent plates 3 and to above the cool air intake port 8, the tip end of which is bent substantially 90 degrees downward to form a guide portion 14. The cool air blown out of the air exit 15 of the second cool air path 10 through the rectifying plate 29 flows along the under surface of the cool wind guide 13. The guide portion 14 changes the flow direction of the above cool air at the tip end side thereof 90 degrees downward to turn the direction toward the cool air intake port 8 of the first cool air path 7.

The glass of the cool wind guide 13 is made of a heat insulating laminated glass to decrease dews on the surface thereof by enhancing the heat insulating effect and the length of the guide portion 14 of the cool wind guide 13 is such determined that the lower end of the guide portion 14 may not obstruct to take a plate E placed on the surface of the crescent plate 3a and together with foods S out of the gap between the upper end of the heat insulator 5 adjacent to the cool air intake port 8 and the lower end of the guide portion. The cool wind guide 13 is made of a transparent members so as to easily identify the foods S placed on the plate E.

A drain pipe 12 is provided at the lower end of the second cool air path 10 to drain drops of water produced when the moisture in the air flowing from the first cool air path 7 in the second cool air path 10 is cooled by the air cooling portion 11.

Counters 4 and 4A are provided at appropriate places with smokeless roasters 22 on another base frame 21 other than the base frame 6 of the crescent conveyer 2. The smokeless roaster 22 has a burner 23 and a burner switch 24 disposed at the side. An iron plate or net 25 is placed on the burner 23.

The lower part of the smokeless roaster 22 is connected with a smoke exhaust duct 26 extending downward in the base frame 21, to which a main smoke exhaust duct 27 is connected being provided in the central space of the base frame 6.

Figure 3:
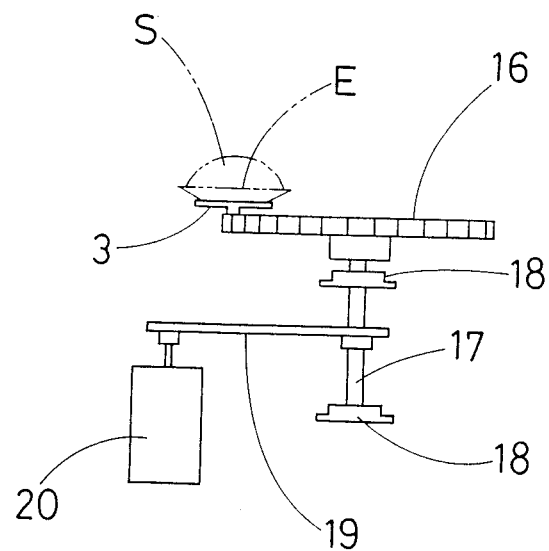
FIG. 3 is a fragmentary enlarged view of a driving system of the endless conveyer of FIG. 1.

FIG. 3 illustrates a driving system of the crescent conveyer 2. The crescent conveyer 2 is provided with a driving sprocket 16 at a corner thereof (see: FIG. 1). The sprocket 16 is rotatably supported by upper and lower bearing 18, 18 with a driving shaft 17 perpendicularly attached. The driving shaft 17 is connected to a motor 20 via a chain 19. When the motor 20 is driven, the driving shaft 17 is rotated via the chain 19 to drive the crescent chain 3, thus a plurality of crescent plates 3a —3a are circulated.

In serving foods to customers sitting at counters 4 and 4A of the circulative catering table 1, the driving motor 20 is first actuated while a number of fans 9 are operated.

The driving motor 20 is driven to operate the crescent chain 3. When cooks at the cooking place inside a partition 28 sequentially place plates E carrying foods such as meat, vegetable or sushi on a number of crescent plates 3a —3a of the crescent chain 3, the plates E—E sequentially move along the course of the crescent conveyer 2. Alternatively, when the fans 9—9 are operated, the air in the first cool air path 7 is sent to the second cool air path 10 which is cooled by the air cooling portion 11 and being made a uniform stream by rectifying plate 29, blown out of the cool air exit 15 provided at the upper end of the second cool air path 10. The cool air blown out of the cool air exit 15 is turned 90 degrees downward by the guide portion 14 of the cool air guide 13 and flows directly to the cool air intake port 8, then into the first cool air path 7. The ambient air cooled by the cool air blown out of the cool air exit 15 drops on the crescent conveyer 2.

In this case, the cool air descending along the inside surface of the cool air guide portion 14 acts as an air curtain which prevents the cool air on the crescent conveyer 2 from escaping from the gap between the lower end of the cool air guide portion 14 and the upper end of the heat insulator 5 as well as the dust outside from entering the crescent conveyer 2. Moreover, since the cool air acts as an air curtain, the portion below the cool wind guide 13 is enclosed by the cool air, thus the foods S on the plate E being cooled mildly and prevented from deterioration by drying.

When the foods S circulated by the crescent conveyer 2 are sushi, for example, the customer at the counter 4 finds his desired one through the cool wind guide 13, reaches out from below the guide portion 14 and takes out the plate E carrying the foods S. The foods S directly touches the flow of the cool air is passing under the guide portion 14 but the freshness is not impaired as the time is extremely short.

When the foods S are meats or vegetables, the customers at the counters 4 and 4A take meats or vegetables on the crescent chain 3 in the same way as the above, place them on the iron plate or the net 25 on the smokeless roaster 22, operating the burner switch 24 at the side of the counter 4 to ignite the burner. The meats and the vegetables roasted by the burner 23 produce smoke but the smoke flows into the main exhaust duct 27 through the exhaust duct 26, preventing the smoke from filling in the room.

The cool air that cooled the foods S on the crescent chain 3 resulting in increasing temperature flows together with the cool air forming an air curtain from the cool air intake port 8 to the first cool air path 7, then to the second cool air path 10, thus circulating for cooling the foods S on the crescent conveyer 2 as described in the above.

What is claimed is:

1. A circulative catering table comprising:
    an endless conveyer circulating according to the circulating course supported in a horizontal plane at a designated height by a base frame and supporting foods at designated intervals,
    an appropriate number of counters, for eating and drinking disposed outside of the endless conveyer,
    smokeless roasters disposed at appropriate places along the counters, and
    a cool air circulating system for cooling the foods on the endless conveyer,
    said cool air circulating system including;
    a first cool air path forming a lower opening provided between the outside of the endless conveyer and the counter and extending downwards of the base frame in communication with the lower opening,
    a second cool air path disposed in opposition to the lower opening against the endless conveyer, with a lower part thereof in communication with the first cool air path and with the an opening at an upper end, that blows out the cool air in a direction crossing above the endless conveyer and toward a space above the lower opening,
    both of the first and the second cool air paths being covered with heat insulators,
    a blowing means which sends the air of the first cool air path to the second cool air path,
    a cooling means which cools the air of the second cool air path and
    a cool wind guide, one end of which is secured to an upper part of the upper opening of the second cool air path and the other end of which extends over the lower opening and forms a guide portion having a gap for taking out the foods placed on the endless conveyer.

2. A circulative catering table provided with a cool air circulating system according to claim 1, wherein the blowing means for sending cool air of the first cool air path to the second cool air path are fans disposed at suitable places in the second cool air path.

3. A circulative catering table provided with a cool air circulating system according to claim 1, wherein the cool wind guide is made of transparent material.

* * * * *